3,634,232
PROCESS FOR REMOVING DISSOLVED OXYGEN FROM AQUEOUS FLUIDS
Arthur K. Dunlop, Berkeley, Calif., assignor to Shell Oil Company, New York, N.Y.
No Drawing. Filed Mar. 23, 1970, Ser. No. 22,063
Int. Cl. C02b 9/00
U.S. Cl. 210—63                              10 Claims

ABSTRACT OF THE DISCLOSURE

Dissolved oxygen is removed from aqueous fluids by incorporating therein very minor amounts each of sulfite ion and a peroxide compound.

---

This invention relates to a method of inhibiting oxygen-induced corrosion or other deterioration in substantially aqueous systems by treating the fluids employed therein with a combination of additives to remove the oxygen therefrom by chemical reaction.

The degree of corrosion of metallic parts by aqueous fluids is dependent among other factors on the dissolved oxygen content of such fluids. Even traces of oxygen can cause severe pitting corrosion of carbon steel pipe lines. To prevent oxygen-induced corrosion, traces of oxygen are commonly "scavenged" by treatment with one or more chemicals which will react with the oxygen thereby converting it to a reaction product that is harmless, or at least less harmful than the uncombined oxygen. The use of alkali metal sulfites such as sodium sulfite for this purpose is well known in the art.

Sulfite ions react with oxygen to form sulfates according to the overall equation $2\ SO_3^{--} + O_2 \rightarrow 2\ SO_4^{--}$. It is generally taught by the art that this reaction only takes place in the presence of heavy metal cations, e.g., cobalt, manganese, iron or copper or a mixture of two or more metals. In some water, e.g., boiler feed water, there are sufficient traces of these metal cations available to satisfactorily catalyze the sulfite-oxygen reaction without the need for the separate addition of metal catalysts. Normally, however, additional amounts of metal cations are required to catalyze the scavenging reaction. In fact sulfite to be used for oxygen removal is commonly sold with catalytic amounts of one or more of the aforementioned metals already added.

While oxygen scavenging with sulfite compounds has been employed with varying degrees of success in a number of water treating applications, difficulties are encountered in controlling oxygen-induced corrosion of water containing certain naturally occurring and other artificially introduced contaminants. Frequently encountered contaminating substances in water in many areas of the country, particularly oil producing areas, are trace amounts of hydrogen sulfide or mercaptans. Such water is sometimes referred to as "sour" water as opposed to "sweet" water which does not contain the aforementioned substances.

The presence of even trace amounts of hydrogen sulfide in water is generally found to interfere with the metal-catalyzed scavenging process, because the metal cations react with the sulfide iron, forming precipitates, and thus are inactivated. For this reason the sulfite scavenging process has not been successfully applied in the treatment of water containing significant quantities of hydrogen sulfide. Other chemicals have been employed to inhibit metallic corrosion in sour water systems, but these compounds generally have not been effective in controlling oxygen-induced corrosivity.

An example of an area where oxygen contaminated sour water has presented particular problems is in the secondary recovery of oil by water-flooding techniques. This method of recovering oil involves injecting an aqueous liquid, e.g., an oil field brine, through ferruginous pipes, e.g., steel, into an oil bearing formation to drive the oil from the zone near the point of injection toward a point at which oil is produced from the formation.

Injection fluids used in water-flooding operations frequently contain trace amounts of dissolved oxygen as well as hydrogen sulfide or mercaptans present as original geological constituents or as a product of the growth of sulfate-reducing bacteria. In treating such sour water it is generally found that cobalt ions commonly used to catalyze the scavenging reaction are precipitated as cobaltous sulfide and therefore the desired reaction does not proceed. This problem could be overcome in part by adding an amount of metal catalyst in excess of that required to precipitate any sulfide present in the aqueous medium, thereby leaving sufficient catalyst to initiate the reaction. This solution, however, is economically disadvantageous, because of the larger amounts of metal catalyst required to precipitate the sulfide ions, and is also technically disadvantageous because the sulfide precipitate thereby formed remains in the aqueous media and can cause plugging of the oil formation.

Another area in which difficulties have been experienced in employing the metal-catalyzed oxygen scavenging process is in the treatment of boiler feed water wherein chelating agents are employed to reduce the formation of mineral deposits. Strong chelating agents, e.g., ethylenediaminetetraacetic acid or the sodium salt thereof, in addition to forming organometallic complexes with obpectionable mineral substances present in the feed water, also form complexes with the metal cations used to catalyze the sulfite-oxygen reaction thereby inactivating the catalyst and preventing the scavenging reaction from occurring.

Because of the interaction between the metal catalysts and the chelating agent, oxygen scavenging with sulfite has been limited to boiler feed systems wherein the sulfite and metal catalyst are injected prior to the addition of the chelating agent. Besides placing severe restrictions on the design of the boiler system, this also results in a reduction in the efficiency of the scavenging process because of the shorter reaction time involved, i.e., the catalyst will be inactivated when it reaches the point at which the chelating agent is introduced.

The need for an improved means to scavenge oxygen from aqueous fluids is clearly evident.

It has now been found that dissolved oxygen can be substantially removed from aqueous fluids by incorporating therein very small amounts each of peroxide compound and of sulfite ion. This is surprising since peroxides are normally considered strong oxidizing agents and therefore would be expected to be a source of oxygen which might aggravate the corrosion problem. However, this is not the case since the peroxide compound apparently is consumed in the process of activating the sulfite ion and thus does not contribute to the oxygen-induced corrosivity of the aqueous system as would be expected. The effectiveness of peroxides in activating the sulfite ion in the presence of hydrogen sulfide was also surprising in view of the fact that other well known free radical initiators such as azo diisobutylnitrile were ineffective in catalyzing the oxygen scavenging reaction in the presence of hydrogen sulfide.

The sulfite ion used in the present process may be incorporated into the fluid to be treated by the addition thereto of any substance which in contact with water forms sulfite ion. This can be accomplished, for example, by injecting $SO_2$ into the aqueous medium, or by adding ammonium or alkali metal bisulfites or ammonium or alkali metal sulfites such as lithium sulfite, potassium sulfite, or sodium sulfite. Of the aforementioned sulfite ion producing compounds, sodium sulfite has been found to be particularly advantageous in preventing oxygen-induced corrosion when used in combination with the peroxide compounds hereinafter described.

Peroxides which can be employed in the present process are those capable of forming a free radical or radicals in aqueous solution either directly or upon reaction with sulfite ion. Such peroxides include organic peroxides, hydrogen peroxide and inorganic peroxides such as sodium peroxide, potassium peroxide and the salts of various peroxy acids, e.g., potassium peroxydisulfate, potassium peroxydicarbonate and the like. Suitable organic peroxides include those of the general formula

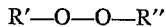

$$R'\text{—}O\text{—}O\text{—}R''$$

wherein R' and R" are hydrogen or organic radicals, having a combined total of less than about 20 carbon atoms. Representative organic peroxides include alkyl peroxides such as propyl or tertiary butyl peroxide; acyl peroxides such as propionyl peroxide or benzoyl peroxide; hydroperoxides such as tert-butyl hydroperoxide or cyclohexyl hydroperoxide; ketone peroxides such as methyl ethyl ketone peroxides; peroxydicarbonates such as diisopropyl peroxydicarbonate; and the like. Mixtures of the aforementioned peroxides may also be employed. The selection of the peroxide oxygen-containing compound which will give optimum performance when used in conjunction with sulfite ion in any given system will depend among other factors on the temperature and pH of the fluid treated. The choice of a particular peroxide for a particular system will be obvious to one skilled in the light of this disclosure and examples. Of the aforementioned peroxide compounds, alkyl hydroperoxides having from 1 to 7 carbon atoms are preferred, particularly tert-butyl hydroperoxide which has been found to be especially effective when combined with sulfite ion in preventing oxygen-induced corrosion in aqueous systems.

The peroxide compounds described above should generally be soluble in the concentrations at which they are employed in the aqueouus system. It is not necessary that the peroxide compounds be dissolved prior to incorporation into the aqueous fluid although it may be desirable from a handling standpoint to add the peroxide compound in solution form. This can be accomplished by preparing a concentrate of the peroxide in water or in water plus some other suitable solvent, e.g., isopropyl alcohol, or in such a solvent alone. The prepared concentrate may then be added in an amount sufficient to give the desired concentration in the fluid to be treated. As previously stated, however, the particular method of introducing the peroxide and sulfite compounds into the aqueous system is not critical and therefore not part of the present invention.

Because the peroxide compounds used in the present invention do not form precipitates with sulfide ions as do metal catalyzing agents, the present process can be employed to treat sour water as well as relatively pure water and thus can be applied to inhibit oxygen-induced corrosion in a wide variety of aqueous systems.

One especially beneficial application of the invention is for the treatment of injection fluids used for secondary oil recovery as hereinbefore discussed. The combination of an organic peroxide with sulfite ion was found to be very effective in removing dissolved oxygen from even very sour oil field brines, which could not be satisfactorily treated by prior art oxygen scavenging methods.

The invention offers further benefits in that the peroxide catalyzing agents do not form complexes with chelating agents as do the transition metal catalysts employed in the art. The present invention therefore provides greater flexibility in designing systems wherein chelating agents are employed, e.g., boiler systems as previously discussed.

The present process is also advantageous in that it reduces the risk of trace metal contamination since it does not employ metal cations to catalyze the sulfite-oxygen reaction. Even minute quantities of metals can deleteriously affect the quality of certain products. Hence, in systems wherein the product comes in contact with cooling or treating water, the present peroxide-catalyzed scavenging process offers distinct advantages over the metal-catalyzed system of the prior art.

In carrying out the invention, sulfifite ion and the peroxide catalyst are incorporated in any convenient manner into the aqueous media to be treated. The amounts employed of these components are preferably the minimum amounts necessary to chemically remove the dissolved oxygen present in the aqueous solution. The concentration of sulfite ion can vary over a relatively wide range, e.g., from 1 to 1,000 p.p.m.; however, concentrations of from 5 to 500 p.p.m. are normally sufficient to react with any dissolved oxygen present in the system. The amount of peroxide compound employed will likewise vary depending on the amount of dissolved oxygen and other contaminants present in the aqueous fluid. Generally the peroxide compound is added in an amount sufficient to give a peroxide oxygen concentration of from 0.1 to 200 p.p.m. in the aqueous medium. Peroxide oxygen concentrations of from 0.1 to 50 p.p.m. will, however, normally be sufficient to activate the sulfite ion. Preferably, the sulfite ion concentration should exceed the peroxide oxygen concentration by a factor of greater than 2.5 in order that no peroxide remains after the oxygen removal is complete.

The pH of the aqueous fluid treated will in some cases influence the effectiveness of oxygen removal. For example, when using tertiary butyl hydroperoxide to activate sulfite ions, it has been found that the rate of the scavenging reaction in highly acidic systems (e.g., pH 0–1) or basic systems (e.g., pH of 9.5 or greater) is considerably reduced. Therefore in treating such systems it is desirable to adjust the pH to a more moderate range, preferably from 6 to 8, in order that optimum scavenging rates may be attained.

The temperature at which the aqueous fluid is treated is not critical and may vary over a considerable range. As in many chemical reactions, an increase in temperature will increase the reaction rate, i.e., the rate of oxygen removal in the present case. For this reason it may be desirable in some applications to raise the temperature of the aqueous fluid prior to treatment. In other applications, particularly where large amounts of water are involved and it would be impractical to heat the fluid, scavenging will preferably be accomplished at the prevailing water temperature.

The following examples provide further illustration of the present invention.

EXAMPLE I

In this example data are presented to show the effectiveness of the peroxides in combination with sulfite ion in chemically removing dissolved oxygen from relatively pure water as well as from water contaminated with various amounts of hydrogen sulfide. Test results obtained on two solutions containing sulfite ion in combination with a catalyzing agent not in accordance with the invention are shown for comparative purposes.

These tests were conducted using aerated distilled water containing approximately 8 p.p.m. dissolved oxygen and which had been treated to remove any trace of metallic contaminants which might otherwise catalyze the sulfite reaction. The rate of oxygen removal was determined using a Magna polargraphic type oxygen probe. The test procedure essentially involved filling a magnetically-stirred glass vessel, adapted to hold an oxygen probe and a pH probe, with the dissolved oxygen-containing distilled water. Sulfide ion in the form of sodium sulfide solution was added to the water and the pH of the resulting solution adjusted to the values shown in Table I using trifluoroacetic acid or sodium hydroxide. To this solution was added sulfite ion in the form of sodium sulfite solution followed by the addition of a peroxide compound.

The dissolved oxygen content of the aqueous solution was continuously measured and recorded on a strip chart recorder connected to the oxygen probe. All determinations were made at approximately 21° C. The oxygen removal rates shown in Table I are expressed as the percentage of the initial oxygen content removed on a per minute basis, e.g., 8 p.p.m. oxygen removed in thirty seconds is equivalent to a rate of 200%/minute.

TABLE I

| Aqueous solution | Catalyzing agent | Sulfide conc., p.p.m. | Sulfite conc., millimoles/ liter | Catalyzing agent conc., millimoles/ liter | ph | Initial oxygen removal rate, percent/ minute |
|---|---|---|---|---|---|---|
| 1 | tert-Butyl hydroperoxide | 0 | 1 | 0.005 | 6.8 | 105 |
| 2 | do | 0 | 2 | 0.005 | 7.0 | 315 |
| 3 | do | 10 | 1 | 0.375 | 7.1 | 105 |
| 4 | do | 10 | 2 | 0.375 | 7.3 | 160 |
| 5 | do | 50 | 2 | 0.500 | 7.2 | 200 |
| 6 | do | 100 | 2 | 0.050 | 7.3 | 11 |
| 7 | do | 100 | 2 | 0.250 | 7.3 | 70 |
| 8 | do | 100 | 2 | 0.500 | 7.2 | 215 |
| 9 | Hydrogen peroxide | 0 | 2 | 0.500 | 7.1 | 38 |
| 10 | Azo diisobutylnitrile | 0 | 2 | 0.500 | 7.3 | 0 |
| 11 | do | 0 | 2 | 1.000 | 6.0 | 0 |

The foregoing data illustrate that in the absence of sulfide ion very small amounts of peroxide in combination with sulfite ions give quite high oxygen removal rates. It can be seen from the results obtained on Solutions 6, 7 and 8, that in the presence of large amounts of sulfide ion, increased concentrations of peroxide are required to maintain the same level of activity. Such an increase in peroxide concentration does not, however, adversely affect the properties of the aqueous system as would be the case if additional quantities of metal catalyst were added to compensate for the sulfide ion. For example, it would take approximately 184 p.p.m. of cobaltous ion to precipitate the 100 p.p.m. sulfide ion present in Solutions 6, 7 and 8. This would thereby contribute approximately 284 p.p.m. to the total solids content of the respective solutions. In contrast, the addition of further quantities of peroxide has no effect on the solids content of the aqueous solutions. Results obtained on Solutions 10 and 11 indicate that azo diisobutylnitrile, a catalyzing agent not in accordance with the invention, is ineffective in activating the sulfite ion.

EXAMPLE II

To illustrate the benefits to be realized in the practice of the invention as applied to treating injection fluids used for secondary oil recovery, a sour oil field brine taken from the South Pine Flood, Glendive, Mont., was treated in accordance with the present process. The brine was selected for these tests because it contained both dissolved oxygen and substantial amounts of hydrogen sulfide and had caused severe corrosion problems in the field. An analysis of the brine is shown in Table II.

The removal of oxygen was accomplished at different temperatures and pH values using the concentrations and additives shown in Table III. Oxygen removal rates were determined using the apparatus described in Example I and are expressed as the percentage of the initial oxygen concentration removed during the first minute. The time required for complete oxygen removal ranged from over 6 minutes at 5° C. to 3 minutes at 36° C.

TABLE II

Composition of South Pine Water Flood brine

| Ion: | Concentration, p.p.m. |
|---|---|
| Sodium | 9,250 |
| Calcium | 1,575 |
| Magnesium | 250 |
| Chloride | 18,200 |
| Sulfate | 760 |
| Bicarbonate | 430 |
| Sulfide | 25 |

TABLE III

| Run No. | Temp., °C. | pH | Conc. $Na_2SO_3$, p.p.m. | Conc. tert-butyl hydroperoxide, p.p.m. | Initial oxygen conc., p.p.m. | Initial $O_2$ scavenging, percent/ minute |
|---|---|---|---|---|---|---|
| 1 | 5 | 6.6 | 79 | 4.5 | 0.3 | 10 |
| 2 | 5 | 6.6 | 158 | 9.0 | 0.2 | 20 |
| 3 | 22 | 6.6 | 39.5 | 2.25 | 0.4 | 20 |
| 4 | 22 | 6.5 | 79 | 4.5 | 0.4 | 55 |
| 5 | 36 | 6.6 | 39.5 | 1.13 | 0.5 | 44 |
| 6 | 36 | 7.2 | 39.5 | 1.13 | 0.4 | 20 |

The foregoing results indicate that dissolved oxygen can be removed from oil field brines contaminated with substantial amounts of hydrogen sulfide by practice of the present invention.

I claim as my invention:

1. A method of removing dissolved oxygen from aqueous fluids by incorporating therein from 1 to 1,000 p.p.m. of sulfite ion and in an amount sufficient to give a peroxide oxygen concentration of from 0.1 to 200 p.p.m., a peroxide compound selected from the group consisting of hydrogen peroxide, inorganic peroxides and organic peroxides, said organic peroxides having a total of less than about 20 carbon atoms.

2. The method of claim 1 wherein the peroxide compound is an alkyl hydroperoxide.

3. The method of claim 2 wherein the aqueous fluid contains a contaminating amount of hydrogen sulfide.

4. The method of claim 3 wherein the organic peroxide is tert.-butyl hydroperoxide.

5. In a method for the secondary recovery of oil wherein flooding water is injected through ferruginous pipes into an oil-bearing formation to displace a portion of the residual oil therein toward a producing well, the improvement which comprises including in said flooding water from 1 to 1,000 p.p.m. sulfite ion and in an amount sufficient to give a peroxide oxygen concentration of from 0.1 to 200 p.p.m., a peroxide compound selected from the group consisting of hydrogen peroxide, inorganic peroxides and organic peroxides, said organic peroxides having a total of less than about 20 carbon atoms.

6. The method of claim 5 wherein the peroxide is an organic peroxide.

7. The method of claim 6 wherein the flooding water is a sour oil field brine.

8. The method of claim 5 wherein the sulfite ion is formed from $SO_2$ or an alkali metal sulfite.

9. The method of claim 7 wherein the peroxide is an alkyl hydroperoxide.

10. The method of claim 5 wherein the peroxide is tert.-butyl hydroperoxide and the sulfite ion is formed from sodium sulfite.

References Cited

UNITED STATES PATENTS

| 1,765,344 | 6/1930 | Pietzsch et al. | 21—2.5 X |
| 2,041,584 | 5/1936 | Adler | 210—62 X |
| 2,576,442 | 11/1951 | Borglin et al. | 210—63 X |
| 2,999,809 | 9/1961 | Eigner et al. | 210—47 X |
| 3,119,447 | 1/1964 | Raifsnider et al. | 252—8.55 D X |

MICHAEL ROGERS, Primary Examiner

U.S. Cl. X.R.

21—2.7; 166—275; 252—8.55, 387